United States Patent [19]
Richter

[11] Patent Number: 5,473,935
[45] Date of Patent: Dec. 12, 1995

[54] METHOD AND DEVICE FOR CHECKING AND REPAIRING WATERPROOFING

[76] Inventor: Hans Richter, Ortlerstrasse 77, Augsburg, Germany, D-8900

[21] Appl. No.: 938,128
[22] PCT Filed: Jan. 17, 1992
[86] PCT No.: PCT/EP92/00083
  § 371 Date: Nov. 18, 1992
  § 102(e) Date: Nov. 18, 1992
[87] PCT Pub. No.: WO92/13143
  PCT Pub. Date: Aug. 6, 1992

[30] Foreign Application Priority Data

Jan. 21, 1991 [DE] Germany ............... 41 01 565.7

[51] Int. Cl.⁶ ............... G01N 23/204; E02B 3/16; G01M 3/04
[52] U.S. Cl. ............... 73/40.5 R; 73/49.2; 405/128
[58] Field of Search ............... 73/40.5 R, 49.2, 73/40; 138/97; 405/54, 129, 128, 53

[56] References Cited

U.S. PATENT DOCUMENTS 3,750,711  8/1973  Conklin et al. ............... 73/40.5 R X
3,762,446  10/1973  Tungseth et al. ............... 73/40.5 R X
4,352,601  10/1982  Valiga et al. ............... 405/54 X
4,753,551  6/1988  Brueggemann et al. ............... 405/54 X
4,846,604  7/1989  Holtmann ............... 405/129 X
5,155,356  10/1992  Peters et al. ............... 73/49.2 T X

FOREIGN PATENT DOCUMENTS 1102503  3/1961  Germany ............... 405/54
 63835  3/1989  Japan ............... 73/40
119035  9/1990  Japan ............... 73/40.5 R
223839  9/1990  Japan ............... 73/49.2 T Primary Examiner—Hezron E. Williams
Assistant Examiner—J. David Wiggins
Attorney, Agent, or Firm—Pascal & Associates

[57] ABSTRACT

The invention calls for a pipe with perforated walls to be laid on, in or under the waterproofing, such as located on and under waste dumps, to be monitored and if necessary repaired, the monitoring and repair operations being undertaken from this pipe.

3 Claims, 3 Drawing Sheets

METHOD AND DEVICE FOR CHECKING AND REPAIRING WATERPROOFING

DESCRIPTION

1. Field of the Invention

The invention relates to a method and a device for checking and repairing base and surface waterproofings of garbage dumps or the like.

2. Background of the Invention

These types of waterproofings are currently constructed like so-called combination seals consisting of one or more layers of a mineral material combined with plastic webs. The demands on their tightness are very high.

To detect any possible leaks, there is the method which has become known under the name "LEOS" according to which pipes permeable to gas are placed in the combination proofing layer. When there are partial leaks, gas enters a pipe. By moving the air column in the pipe, the area with the concentrated gas is also pushed out of the pipe, so that, at the end of the pipe, the position of the leak can be ascertained by calculating back. The method is unreliable in its measurement results because the pores of the pipe become easily clogged and mixtures can occur in the air column and with water. In surface waterproofings, the leaks can only be repaired by digging up the layers of earth on them. It is not possible to repair base waterproofings with this method.

Another method which has become known for detecting holes operates with electrically conductive coordinate grid systems in the plastic web. Repairs are also not possible in this case.

SUMMARY OF THE INVENTION

An object of the invention is to create a device and a method which do not have these disadvantages.

In accordance with an embodiment of the invention, a method for detecting leaks of waterproofing of garbage dumps and for repairing of the waterproofing in the case of leaks therein, wherein an operating pipe system with perforated pipes is located approximately in the center of the waterproofing, is comprised of the steps of (a) inserting an air tube 8 (see part 8 in FIG. 2) having an outside diameter corresponding to an inside diameter of one of the pipes into one of the pipe(s) 6 fare, the air tube having a first opening 14 on its circumferential wall and containing a suction tube 13 connected to the first opening, the air tube having at least a second opening 11 on its circumferential wall and containing a further tube 12 connected to the second opening, (b) inflating the air tube by compressed air to close perforations of the pipe except those which are in a region of the first and second openings, (c) applying suction to the suction tube to detect liquid in the region of the first and second openings, (d) in the event liquid is detected, pressing a sealing liquid through the further tube, the second opening, and perforations in the region of the first and second openings for penetration into the waterproofing, (e) releasing the compressed air from the air tube and moving the air tube a distance through the pipe in the direction of the opposite end of pipe, where such distance is of the order of the spacing between perforations on pipes of the operating pipe system, (f) repeating the steps (a)–(e) until the entire length of the pipe is checked, and (g) repeating the steps (a)–(f) on other pipes of the operating pipe system.

BRIEF INTRODUCTION TO THE DRAWINGS

Embodiments of the invention are explained in greater detail below with reference to the drawings, in which.

DETAILED DESCRIPTION OF THE INVENTION

Figure 1:
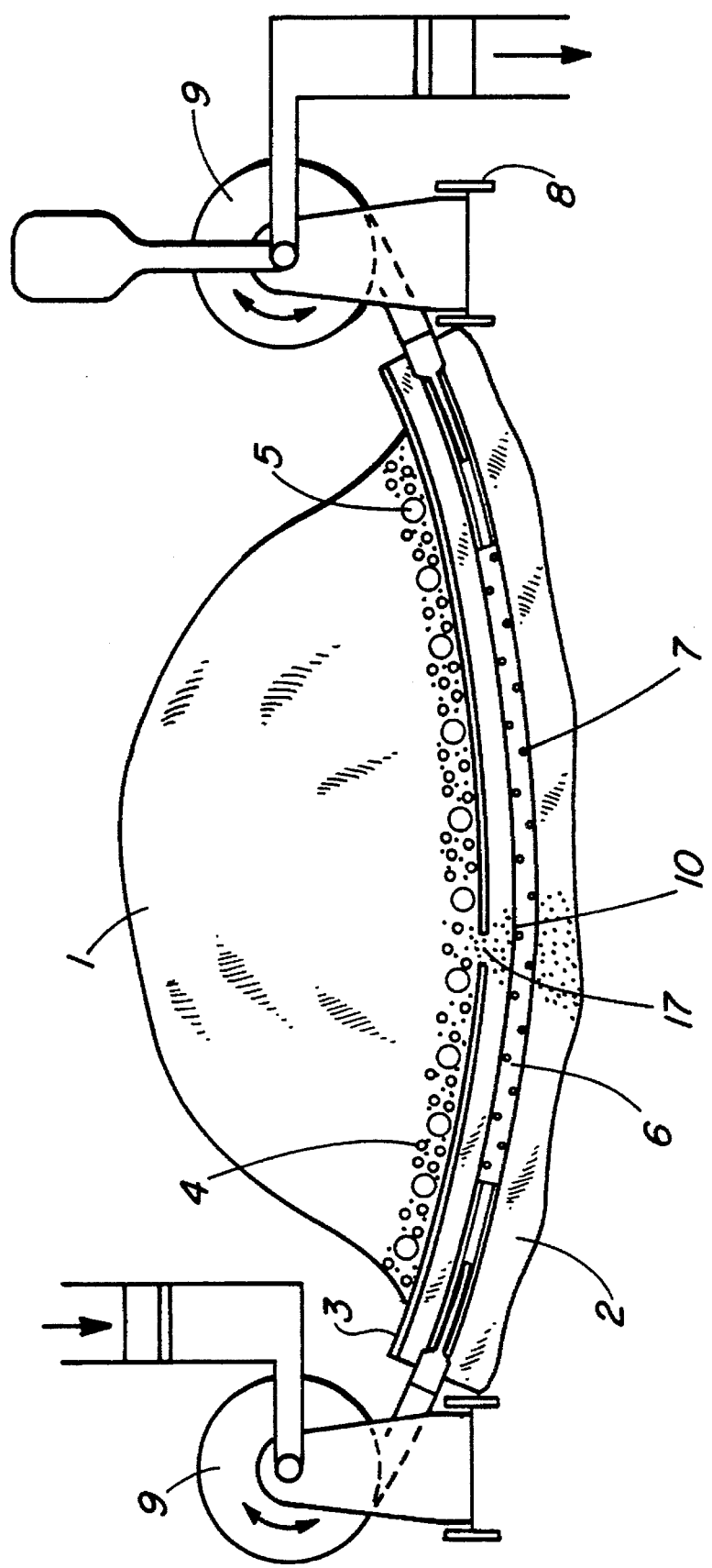
FIG. 1 is a cross-section through a garbage dump with a base waterproofing and furnished with the device of the invention.
Figure 2:
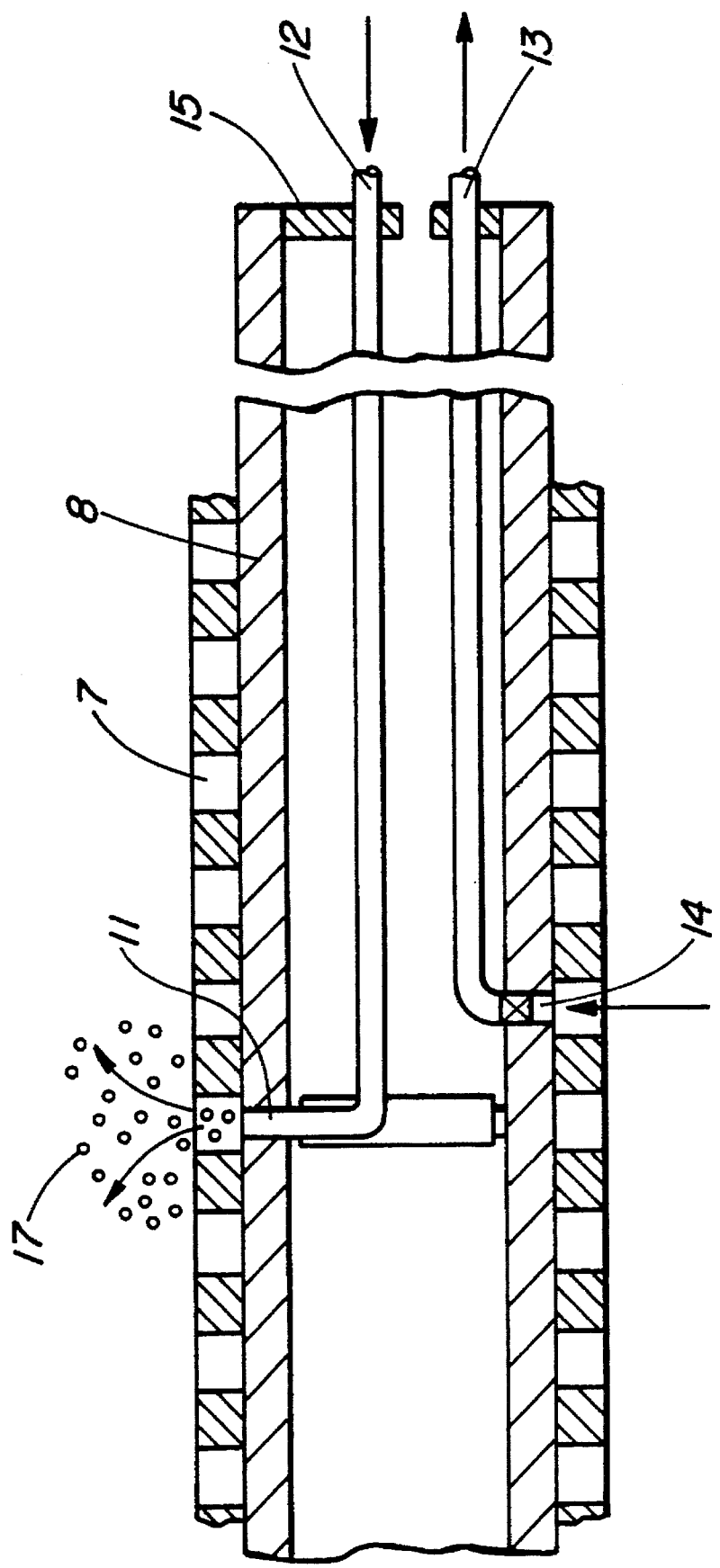
FIG. 2 is an enlarged section from FIG. 1 that shows a basic embodiment for the device of the invention.

A base waterproofing or combination seal comprising of a mineral layer 2, plastic web 3, a gravel layer 4 with drainage pipes 5 in it is installed like a tub under the garbage dump 1. An operating pipe system with many pipe(s) 6 having openings or perforations 7 is placed below the plastic web 3. Air tube 8, which is wound up on cable rollers 9 on the right and left, is inserted into the operating pipe system 6. The air tube 8 is under air pressure during the control and repair phase, so that it is thicker in its while outside diameter outside the operating pipe 6 since it is not encased thereto by the surrounding operating pipe 6.

Figure 3:
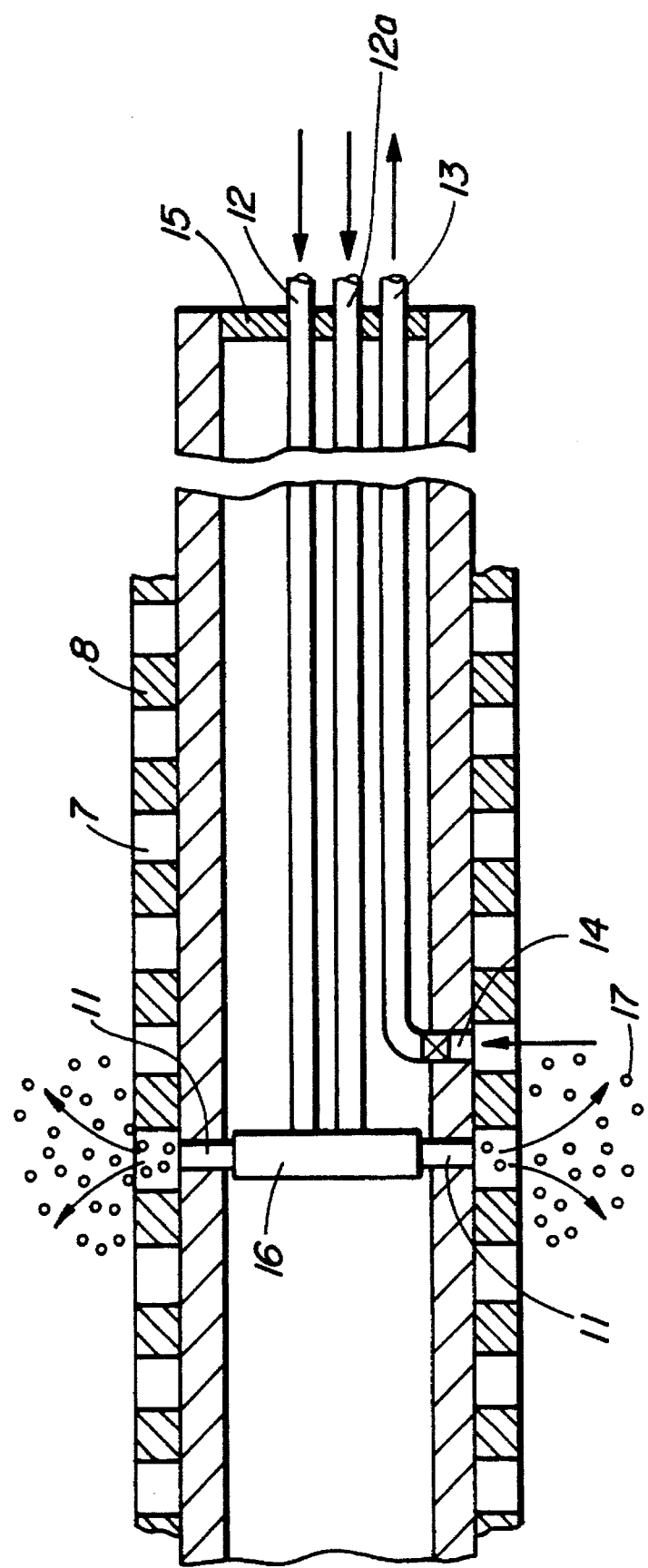
FIG. 3 is an enlarged section from FIG. 1 of the device of the invention.

In FIG. 3, which shows the detail at a region of known leak 10 the air tube 8 has at least two openings 11 to which the further tube 12, the third tube 12a, and the suction tube 13 are attached. Tube 13 is connected to the radial opening 14. Tubes 12, 12a and 13 are led outward through the airtight wall 15 at the ends of the air tube 8. Tubes 12 and 12a are led into a mixing chamber 16 from where there is passage to openings 11.

Several operating pipes 6 are placed more or less in close proximity to one another, depending on what the checkability and reparability of the base waterproofing is to be.

To check and, if necessary, to repair an area, the air tube 8 is now inserted into the operating pipe 6 so far that it reaches the tube roller 9 at the other end of operating pipe and the middle area of air tube with the openings 11 and 14 comes to lie at the beginning of the operating pipe 6. The air tube 8 is then inflated with compressed air. As a result, it expands and closes all openings 7 of the operating pipe except those which are in the area of openings 11 and 14 in the middle of the length of the air tube 8.

By suction on tube 13 from a vacuum means supplied via the centre of the tube roller 9, it is ascertained whether or not undesired liquid is present at the position in question. If no, then the watertight integrity of the combination seal has been established for this particular region beneath the landfill/garbage dump. If yes, one or two component sealing liquid 17 is pressed in via tubes 12 and 12a, mixed in the mixing chamber 16 and penetrates into the mineral layer 2 of the waterproofing at openings 11 through the perforation (openings 7) of the operating pipe, hardens there and thus seals the leaky plastic web 3 at known leaky region 10 or the additional sealing layers below or above.

According to the invention, this method can be used for all types of waterproofing such as water-repellent concrete, asphalt, bituminous. felt, etc.

After this step, the air is let out of the air tube to air tube then moved a desired distance along the operating pipe 6 by turning the tube roller 9 an appropriate amount and again inflated. In this way, the procedure can be continually repeated until the entire operating pipe 6 is checked and sealed, and then subsequently all others in the base waterproofing network of several operating pipes.

I claim:

1. A method for detecting leaks of waterproofing of garbage dumps and for repairing of said waterproofing in the case of leaks therein, wherein an operating pipe system with perforated pipes is located approximately in the center of the waterproofing, comprising the steps of:

(a) inserting an air tube having an outside diameter corresponding to an inside diameter of one of said pipes into said one of said pipes, the air tube having a first opening and containing a suction tube connected to the first opening, the air tube having at least a second opening and containing a further tube connected to the second opening, (b) inflating the air tube by compressed air to close perforations of the pipe except those which are in a region of the first and second openings, (c) applying suction to the suction tube to detect liquid in the region of the first and second openings, (d) in the event liquid is detected, pressing a sealing liquid through the further tube, the second opening and perforations in the region of the first and second openings for penetration into the waterproofing, so as to seal the source of any leaks causing the liquid detection event, (e) releasing the compressed air from the air tube and moving the air tube a distance through the pipe in the direction of the opposite end of pipe, where such distance is of the order of the spacing between perforations on pipes of the operation pipe system, (f) repeating the steps (a)–(e) until the entire length of the pipe is checked, and (g) repeating the steps (a)(f) on other pipes of the operating pipe system.

2. A method as defined in claim 1, in which the air tube contains a third tube parallel to the further tube, the third and further tubes each being connected to separate inlets on a mixing chamber, such that the further tube is not connected with the second opening, the mixing chamber having an outlet connected with the second opening, including the step of pressing two components of a sealant separately through the third and further tubes for mixing in the mixing chamber, whereby the mixing components are pressed through the outlet having a tubular connection directed towards the second opening.

3. A method as defined in claim 1 including rotating the air tube about its longitudinal axis by a certain fraction of a full revolution, such as a quarter or half revolution clockwise, then rotating the air tube a quarter or half revolution counter clockwise following release of compressed air in step (e), so as to check for leaks at and/or repair leaks at different directions of angle about external to the perforated pipe wall.

* * * * *